(12) United States Patent
Kanamaru et al.

(10) Patent No.: US 6,807,948 B2
(45) Date of Patent: Oct. 26, 2004

(54) FUEL FEEDER

(75) Inventors: Shigeki Kanamaru, Tokyo (JP); Seiji Tsutsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/459,611

(22) PCT Filed: Dec. 12, 2001

(86) PCT No.: PCT/JP01/10906

§ 371 (c)(1),
(2), (4) Date: Jun. 12, 2004

(87) PCT Pub. No.: WO03/050407

PCT Pub. Date: Jun. 19, 2003

(65) Prior Publication Data

US 2004/0173187 A1 Sep. 9, 2004

(51) Int. Cl.[7] ................................................ F02C 37/04
(52) U.S. Cl. ...................... 123/495; 123/509; 123/510; 123/198 C; 210/243; 210/348
(58) Field of Search .................................. 123/495, 509, 123/510, 514, 457, 198 C, 458, 497; 210/348, 243, 416.4, 446

(56) References Cited

U.S. PATENT DOCUMENTS 5,782,223 A * 7/1998 Yamashita et al. .......... 123/510
5,785,032 A     7/1998 Yamashita et al.
6,142,126 A    11/2000 Kanamaru
6,168,713 B1    1/2001 Sekine et al.
6,245,231 B1    6/2001 Maki et al.

FOREIGN PATENT DOCUMENTS

| JP | 11-182373 A | 7/1999 |
| JP | 2000-130280 A | 5/2000 |
| WO | WO99/30027 A1 | 6/1999 |

* cited by examiner

*Primary Examiner*—Bibhu Mohanty
(74) *Attorney, Agent, or Firm*—Sughrue Mion, PLLC

(57) ABSTRACT

A discharge path for discharging static electricity generated in a fuel filter built in a fuel supply apparatus mounted in a tank is formed with accuracy. A housing container of a fuel filter 5 is formed by heat welding a main housing 6 and a lid housing 3 at a welding face 5a, a support frame 18 of a filter is formed of a conductive thermoplastic resin, a part of the support frame 18 accommodated in the main housing 6 is at the same height as a welding face 5a, and an end of a peripheral wall for a communicating hole 3a formed on the lid housing 3 is formed at the same height as a heat welding face of the lid housing 3, wherein an earth conductor is connected to an exposed pedestal 18c of the support frame 18 exposed by heat welding the part of the support frame 18 and the end of the communicating hole 3a fluid-tight simultaneously with formation of the housing container.

3 Claims, 6 Drawing Sheets

FUEL FEEDER

TECHNICAL FIELD

The present invention relates to formation of a discharge path for static electricity generated in a fuel filter built in a fuel supply apparatus that is mounted in a fuel tank of a vehicle and supplies fuel to an internal combustion engine.

BACKGROUND ART

FIG. 7 is a sectional view showing a conventional fuel supply apparatus disclosed in the International Publication No. WO99/030027.

In the drawing, reference numeral 1 is a fuel tank, numeral 2 is an opening formed on the fuel tank 1, numeral 3 is a lid housing serving also as a flange that blocks up the opening 2 and is composed of an insulating thermoplastic resin. Numeral 4 is an electric connector formed on the lid housing 3, and numeral 5 is a fuel filter that is formed into a closed container by welding the lid housing 3 serving also as a flange to a main housing 6 made of a thermoplastic resin.

This welding is carried out through a processing method generally called hot plate welding, in which ribs to serve as partitions are formed into a plane symmetry on the main housing 6 and the lid housing 3 respectively, and after end faces of both ribs are heated by a hot plate, the hot plate is removed, and the end faces of both ribs are pressed and heat welded together. Numeral 5a is a welding face welded in this process.

Numeral 7 is a filtering element accommodated in the fuel filter 5. The filtering element 7 is composed of filter paper 7a and a support member 7b for supporting the filter paper 7a, and the support member 7b is composed of a metal or a conductive resin. Numeral 8 is a pressure regulator mounted on a communicating hole 3a for communicating to the inside of the fuel filter 5. Numeral 9 is an electric fuel pump, and an intake filter 10 is mounted on an intake port 9a of the electric fuel pump 9.

Numeral 11 is a pump holding member fitted to an engaging part provided on the main housing 6, and the electric fuel pump 9 is integrally mounted on the fuel filter 5. In this process, a discharge port 9b of the electric fuel pump 9 is coupled to an inlet 5c of the fuel filter provided on the main housing 6 through a seal member 12. Numeral 13 is an earth conductor extending from the electric connector 4 to come in contact with the support member 7b in the fuel filter 5, thereby the support member 7b is electrically connected to the outside. Numeral 14 is a current-carrying terminal for supplying a driving electric power to the electric fuel pump 9 from outside. Numeral 15 is a fuel supply pipe through which a filtered fuel is delivered to the internal combustion engine, and the fuel supply pipe 15 is integrally formed with the lid housing 3 and communicates to an outlet 5d of the fuel filter.

In such a fuel supply system, the fuel pump 9 is driven by the electric power supplied from the conductive terminal 14. The fuel pump 9 pressurizes the fuel liquid taken through the intake filter 10 and delivers the fuel liquid to the fuel filter 5, in which the filtering element 7 filters dust in the fuel liquid, and the fuel liquid is supplied to the internal combustion engine through the fuel supply pipe 15. When pressure in the fuel filter 5 exceeds a predetermined pressure, the pressure regulator 8 releases excess fuel liquid into the fuel tank, thereby stabilizing pressure of the fuel liquid delivered to the internal combustion engine.

Static electricity generated by friction with the filter paper 7a when the fuel liquid passes through the filter paper 7a of the filtering element 7 gives a bad influence upon resin members such as lid housing 3, main housing 6, etc., and therefore electric charge of the fuel liquid is collected into the conductive support member 7b and dissipated through the earth conductor 13.

In the foregoing conventional fuel supply apparatus, the main housing 6 and the lid housing 3 are welded together through hot plate welding and formed into a closed container in which the filtering element 7 is enclosed. In the hot plate welding, the end faces of the ribs of the main housing 6 and the lid housing 3 to be welded together are put in contact with a heated flat plate. When the end faces of the ribs to be welded are semi-molten, the hot flat plate (hot plate) is removed, both end faces of the ribs to be welded are pressed and welded together, and accordingly both welded rib ends are more or less compressed. It is therefore essential that an upper face of the filtering element 7 inserted in the main housing 6 before welding is lower than the end face of the welded rib of the main housing 6.

Accordingly, in the earth conductor 13 made of a metal and provided through the lid housing 3 in a fluid-tight manner, the end of the earth conductor 13 interferes with the hot plate and hinders heating the faces to be welded at the time of hot plate heating. If the end of the earth conductor 13 is set with a distance from the hot plate, the end of the earth conductor 13 does not reach the support member 7b of the filtering element 7 at the completion of welding, and this brings about a problem of contact failure. It is therefore necessary that the end of the earth conductor 13 is set with a slight distance from the face of the hot plate so as to fall within a shrinkage allowance of the welded portion in the pressing and welding process, hence a problem exists in that the welding is complicated and troublesome.

Another problem exists in that heat transferred from the hot plate to the earth conductor 13 brings about looseness at the fluid-tight seal part between the lid housing 3 and the earth conductor 13.

The present invention was made to solve the above-discussed problems and intends to improve working efficiency in hot plate welding and to ensure electrical connection between the earth conductor and a portion where interior static electricity is collected.

DISCLOSURE OF INVENTION

In a fuel supply apparatus according to the present invention, a fuel filter includes a filtering element accommodated in a housing container for filtering a fuel liquid, and a fuel pump is disposed to communicate to an inlet of the fuel filter for pressurizing and delivering the fuel liquid. The housing container includes a main housing and a lid housing both made of a thermoplastic resin, the main housing and the lid housing are heat welded together at a welding face. The filtering element includes a filtering member and a support frame having a exposed pedestal, the exposed pedestal has one face positioned at the same height as the welding face when the filtering element is accommodated in the main housing, the support frame is made of a conductive thermoplastic resin and supports the filtering member. The lid housing has a peripheral wall forming a communicating hole communicated to outside, the peripheral wall has an end face positioned at the same height as the welding face and facing to the one face of the exposed pedestal. An earth conductor is connected to the one face of the exposed pedestal through the communicating hole in the condition that the main housing and lid housing are heat welded, in which the filtering element is accommodated.

Preferably, the earth conductor is welded and connected to the one face of the exposed pedestal simultaneously with heat welding the main housing and the lid housing, under the condition that the earth conductor made of a conductive thermoplastic resin is inserted in the communicating hole.

Still preferably, the earth conductor is inserted in the communicating hole, and the earth conductor is resiliently connected to the one face of the exposed pedestal.

BEST MODE FOR CARRYING OUT THE INVENTION

Embodiment 1

Figure 1:
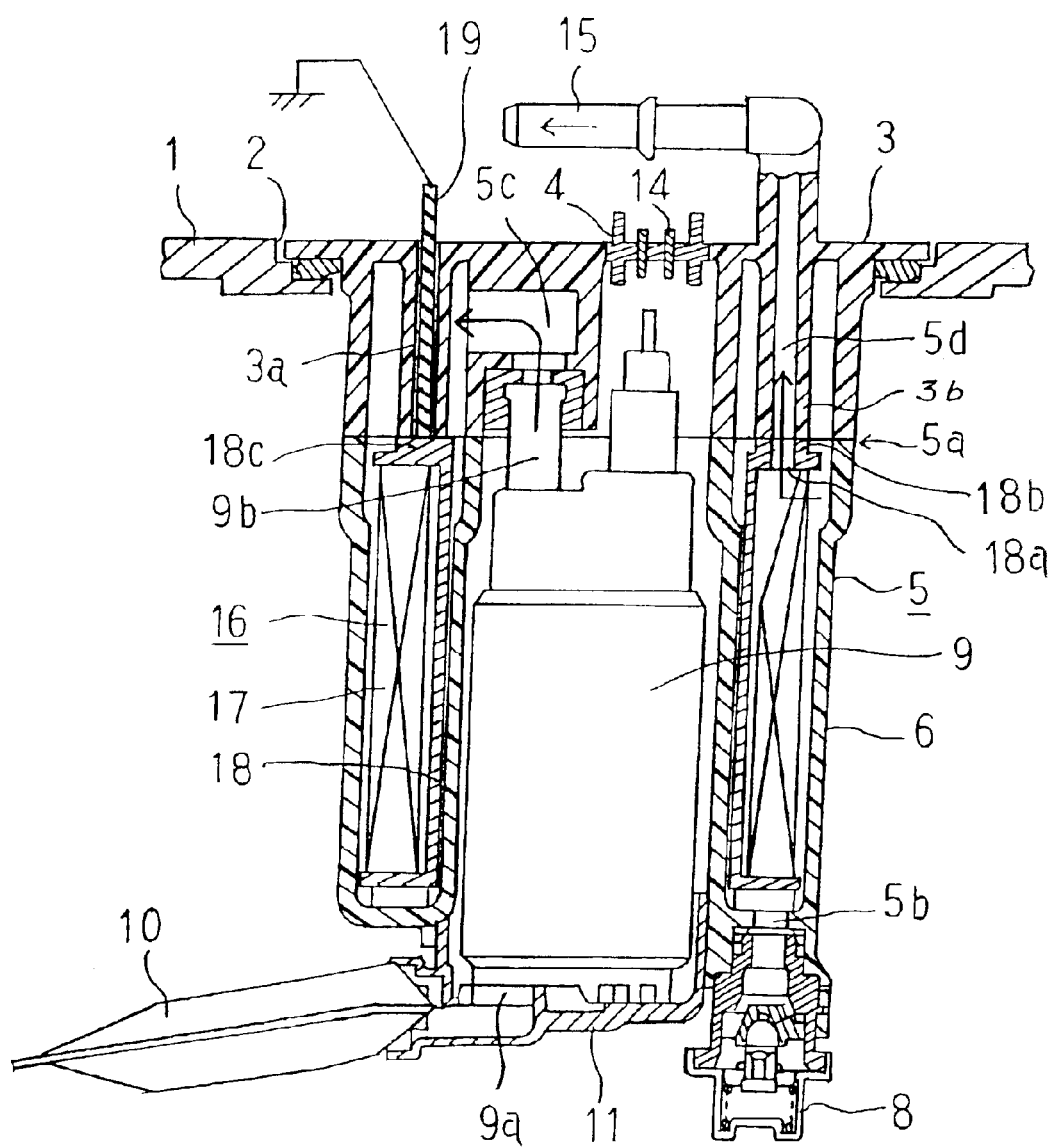
FIG. 1 is a sectional view of a fuel supply apparatus according to Embodiment 1 of the invention.
Figure 2:
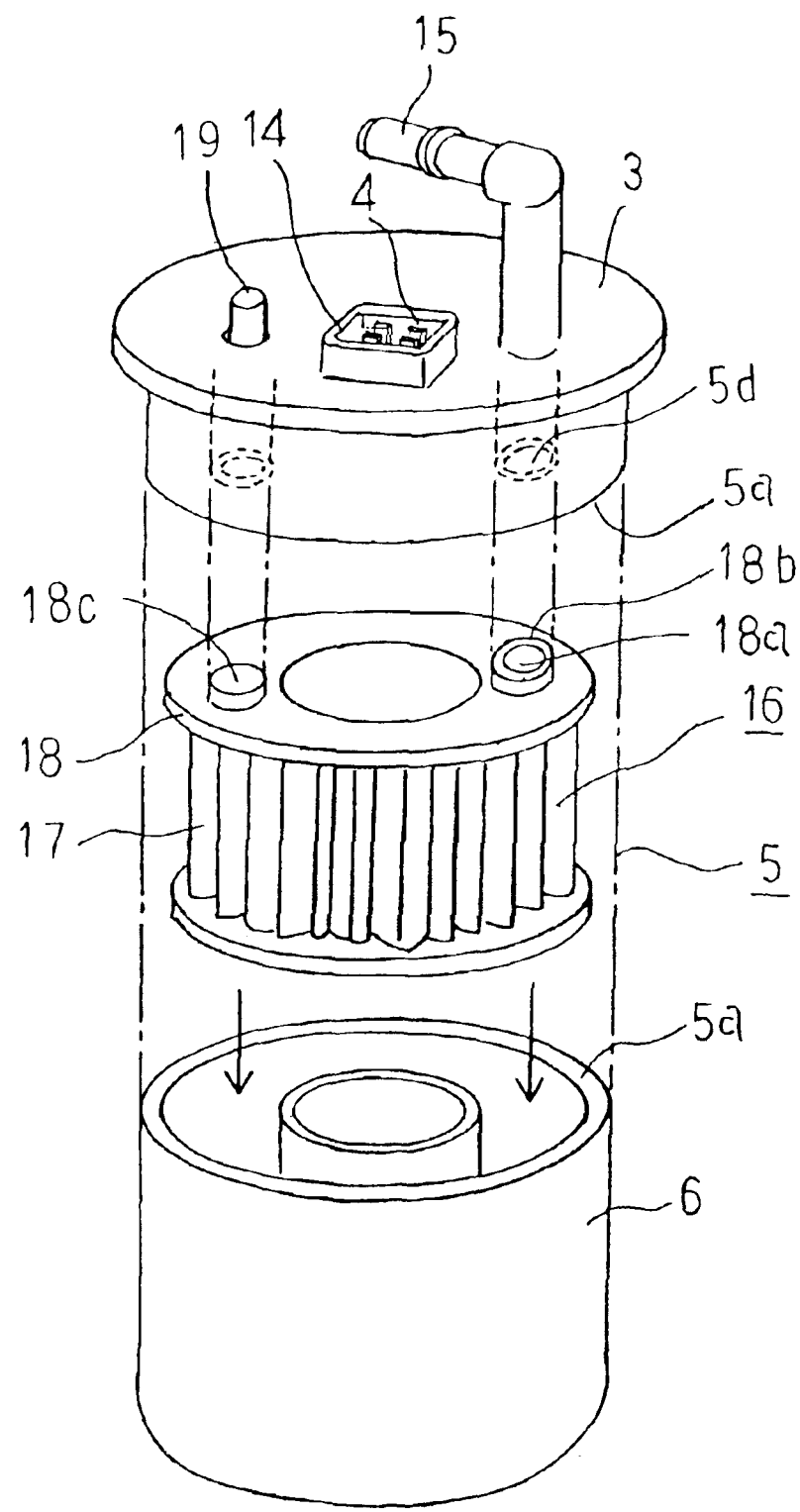
FIG. 2 is an exploded perspective view of a fuel filter of the invention.
Figure 3:
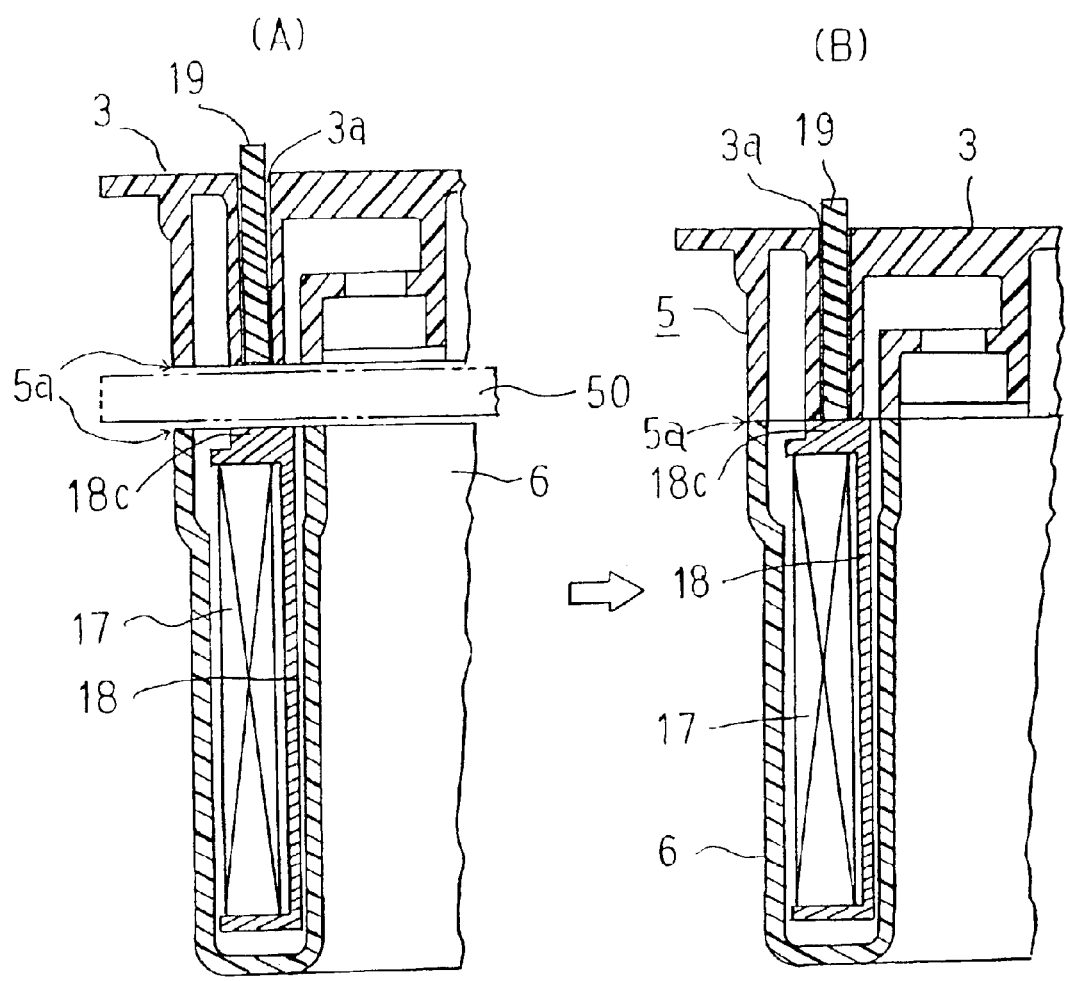
FIG. 3 is a partially sectional view for explaining the heat welding of an earth conductor.

FIG. 1 is a sectional view of a fuel supply apparatus showing Embodiment 1 of the invention, FIG. 2 is an exploded perspective view of a fuel filter 5 according to Embodiment 1 of the invention, and FIG. 3 is a partially sectional view for explaining heat welding of an earth conductor.

Figure 4:
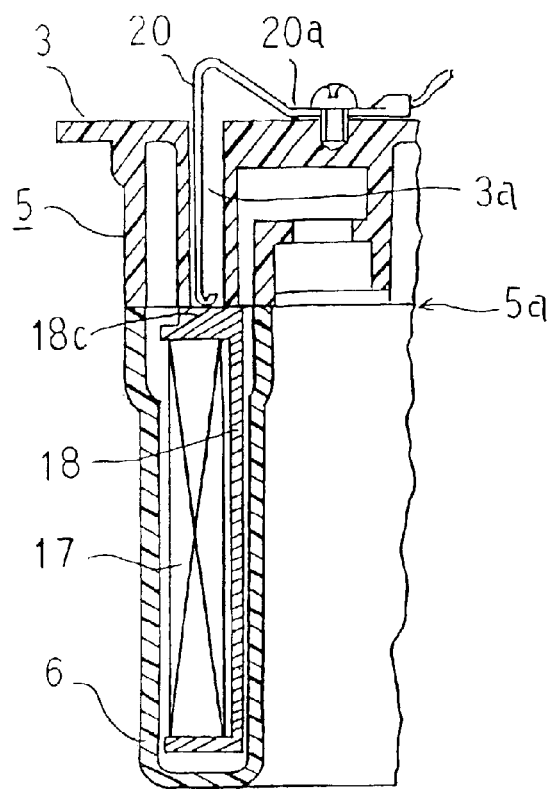
FIG. 4 is a partially sectional view for explaining connection of an earth conductor according to Embodiment 2 of the invention.

FIG. 4 is a partially sectional view of a portion where an earth conductor is connected by another method.

In the drawings, numerals 1 to 6, 8 to 12, 14, and 15 are the same as those designated in the description of the conventional apparatus described above. The main housing 6 and the lid housing 3 are formed of a non-conductive thermoplastic resin, numeral 3a is a communicating hole formed by a peripheral wall extending from upper face of the lid housing 3 toward inside, and numeral 3b is a communicating pipe forming the outlet 5d of the fuel filter. Lower end face of this communicating pipe 3b and the lower end face of the peripheral wall for the communicating hole 3a are positioned at the same height as the welding face 5a of the lid housing 3.

Numeral 16 is a filtering element, numeral 17 is a filter paper acting as a filter member that is chrysanthemum-shaped in section, and numeral 18 is a support frame that is formed of a conductive thermoplastic resin, having flanges at two ends of a cylindrical barrel thereof, and supports the filter paper 17. Kneading thermoplastic resin with metal powder and carbon granules composes the conductive thermoplastic resin. The filtering element 16 is formed by disposing the filter paper 17 around the cylindrical barrel with a distance from the cylindrical barrel and sealing the flanges and ends of the filter paper 17 in a fluid-tight manner with any adhesive agent or the like. Numeral 18a is a filter outlet comprised of a through hole provided on the flange between the cylindrical barrel and the filter paper 17, and this filter outlet 18a has a through hole rib face 18b above the flange face. Numeral 18c is an exposed pedestal having an upper face positioned at the same height as the through hole rib face 18b from the flange face. When the filtering element 16 is accommodated in the main housing 6, the welding face 5a of the main housing 6, the through hole rib face 18b, and the upper face of the exposed pedestal 18c are at the same height in this construction.

When fitting the lid housing 3 to the main housing 6 in which the filtering element 16 is inserted, positioning is ready to be established so that an outer shell rib face of the main housing 6 and an outer shell rib face of the lid housing 3 face each other, the upper face of the exposed pedestal 18c and the lower end face of the peripheral wall for the communicating hole 3a face each other, and the through hole rib face 18b and the lower end face of the communicating pipe 3b face each other. Numeral 19 is an earth conductor made of a conductive thermoplastic resin inserted in the communicating hole 3a and facing to the upper face of the exposed pedestal 18c.

Now, the process of hot plate welding of the fuel filter 5 in the fuel supply apparatus according to the invention is hereinafter described with reference to FIGS. 2 and 3. Referring to FIG. 3, numeral 50 is a hot plate that is used in heat welding and has a heat source inside, and objects to be welded are subject to heating in contact with two flat faces thereof. It is possible to control temperature setting depending upon the material and configuration of the objects to be welded.

First, as shown in FIG. 3(A), one face of the hot plate 50 is put in contact with a rib end face, which is the welding face 5a of the main housing 6 in which the filtering element 16 is accommodated. Since the upper face of the exposed pedestal 18c of the support frame 18 is at the same height as the welding face 5a of the main housing 6, the welding face 5a of the main housing 6 and the upper face of the exposed pedestal 18c are heated at the same time. Then, another rib end face, which is the welding face 5a of the lid housing 3 is put in contact with another face of the hot plate 50. At this time, by inserting the earth conductor 19 in the communicating hole 3a of the lid housing 3, the welding face 5a of the lid housing 3, the lower end face of the peripheral wall for the communicating hole 3a, and a lower end of the earth conductor 19 are heated at the same time. As each of the portions to be heated is made of a thermoplastic resin, at the time when the portions to be heated are semi-molten by heating, the hot plate 50 is removed, and the semi-molten resin portions are pressurized from both sides and welded together as shown in FIG. 3(B), thus forming the fuel filter 5, which is a hermetically sealed housing. In this process, lower end of the earth conductor 19 and the lower end face of peripheral wall for the communicating hole 3a are also welded to the exposed pedestal 18c, and the communicating hole 3a is isolated fluid-tight from inside of the fuel filter 5, whereby the exposed pedestal 18c and the earth conductor 19 are welded together in an electrically conductive manner.

As a result, in this fuel filter 5, the support frame 18 made of a conductive resin collects any static electricity generated when the fuel liquid passes through the filter paper 17 of the filtering element 16 and dissipates the collected static electricity by way of the earth conductor 19 made of a conductive resin.

Embodiment 2

Figure 5:
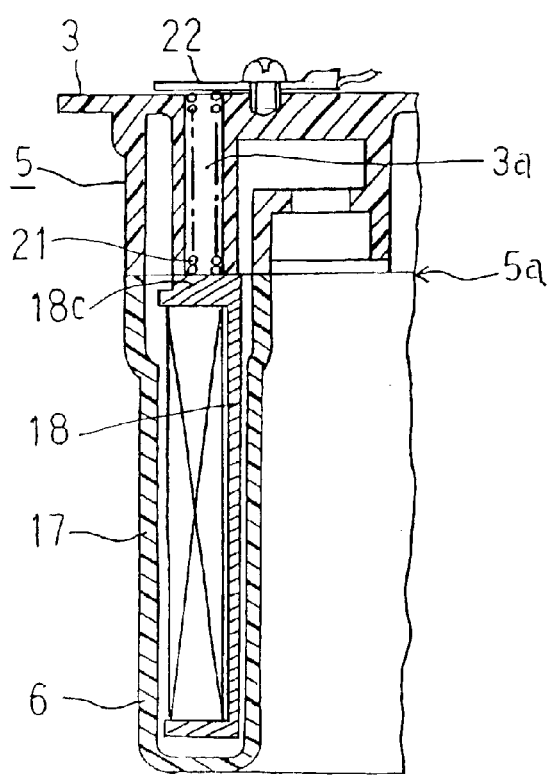
FIG. 5 is a partially sectional view for explaining another method of connecting the earth conductor according to Embodiment 2 of the invention.

FIGS. 4 and 5 are partially sectional views showing connection of an earth conductor in a fuel supply system by another method according to Embodiment 2 of the invention.

In the drawings, numerals 1 to 6, 8 to 12, and 14 to 18 are the same as those described in the foregoing Embodiment 1. In this Embodiment 2, the lid housing 3 is heat welded to the main housing 6 and the support frame 18 without the earth conductor 19. Consequently, a part of the upper face of the exposed pedestal 18c in the communicating hole 3a is exposed to outside of the fuel filter 5.

Referring to FIG. 4, numeral 20 is an L-shaped conductive plate spring, and one side of the L-shape is slightly longer than the depth of the communicating hole 3a and the other side forms an elastic part and a terminal strip 20a. A discharge lead wire is connected to the terminal strip 20a, and the terminal strip 20a is fixed to the lid housing 3 so that the conductive plate spring 20 is press-contacted on the upper face of the exposed pedestal 18c, thereby dissipating the static electricity of the support frame 18.

In addition, referring to FIG. 5, numeral 21 is a conductive spring made of metal having a free length longer than the communicating hole 3a. Numeral 22 is a terminal strip to which a discharge lead wire is connected. The conductive spring 21 is inserted in the communicating hole 3a and the terminal strip 22 holds the conductive spring 21 in a compressed state, thereby dissipating the static electricity of the support frame 18.

Embodiment 3

Figure 6:
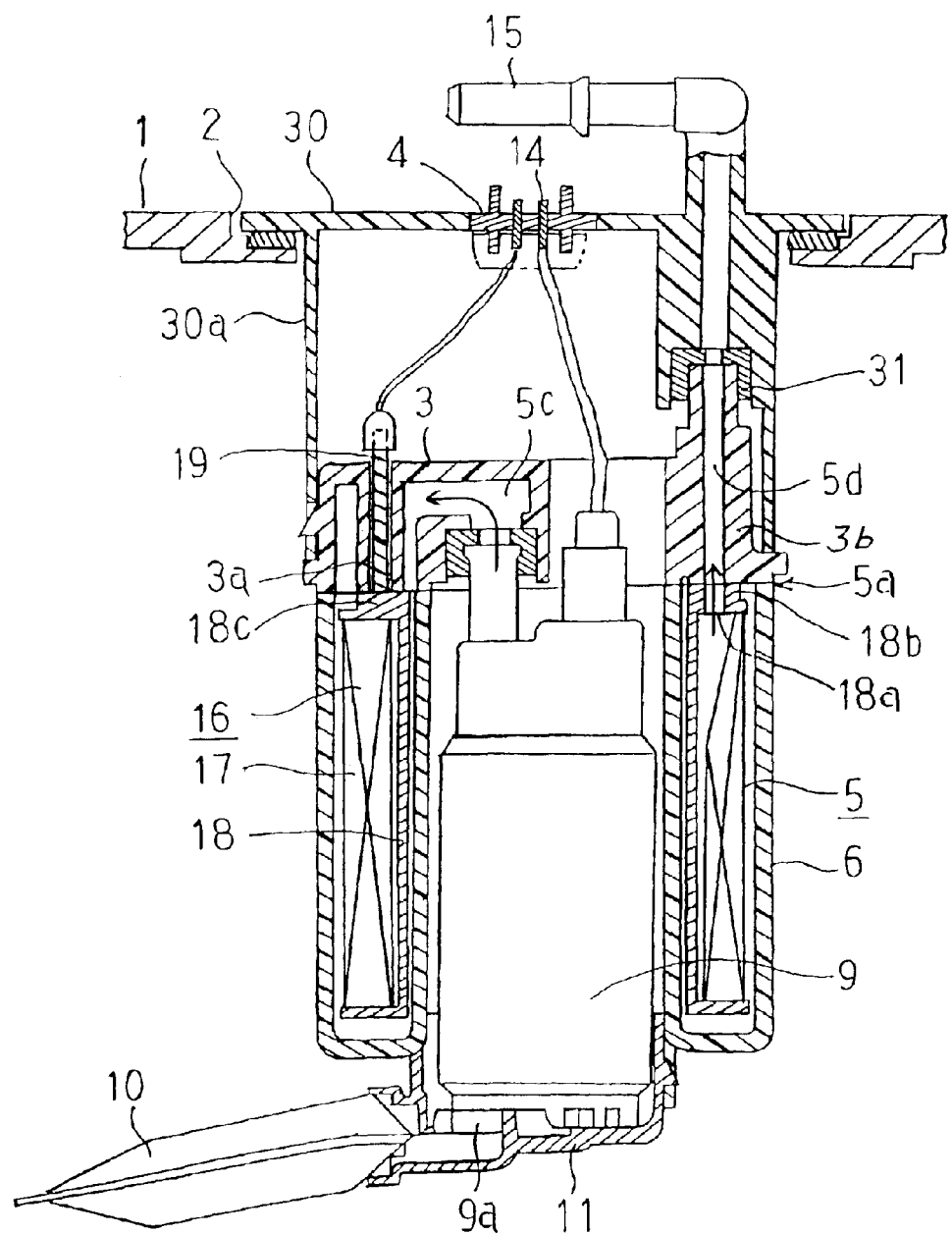
FIG. 6 is a sectional view of a fuel supply apparatus according to Embodiment 3 of the invention.
Figure 7:
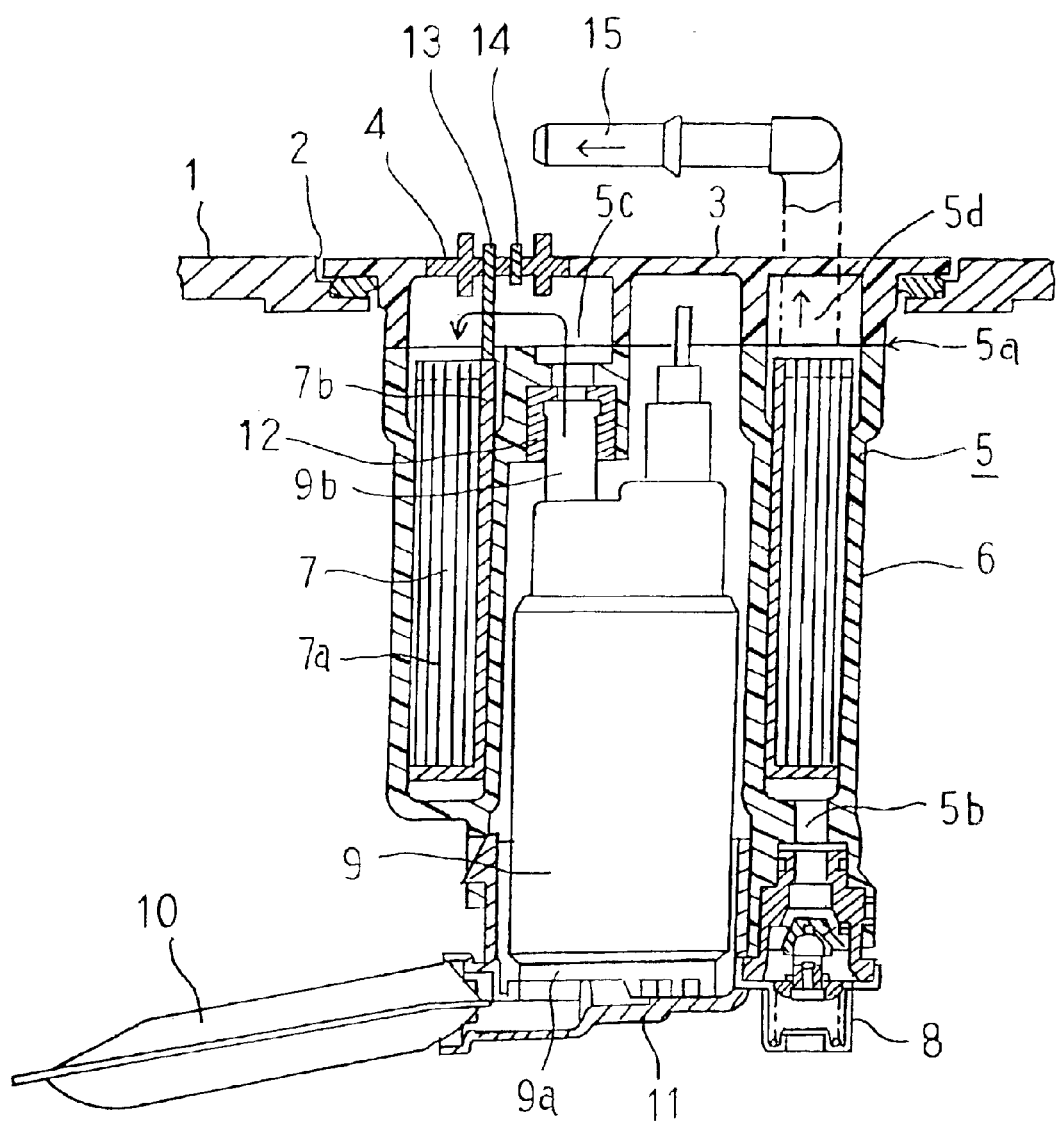
FIG. 7 is a sectional view showing a conventional fuel supply apparatus.

FIG. 6 is a sectional view of a fuel supply system showing Embodiment 3 of the invention. In this Embodiment 3, the lid housing and the flange are separately constructed. In the drawing, numerals 1 to 6, 8 to 12, and 14 to 19 are the same as those described in the foregoing Embodiment 1. Numeral 30 is a flange blocking up the opening 2 of the fuel tank 1, and the flange 30 is provided with the electric connector 4 to outside and the fuel supply pipe 15. The flange 30 is also provided with a skirt part 30a extending toward inside of the fuel tank 1, and this skirt part 30a holds the fuel filter 5. Numeral 31 is a seal packing that is used in order that the fuel supply pipe 15 and the outlet 5d of the fuel filter 5 are coupled fluid-tight when the fuel filter 5 is fit to the flange 30. The pressure regulator 8, which is not shown in the drawing, is mounted on the inside of the skirt part 30a between the flange 30 and the lid housing 3.

In the apparatus according to this Embodiment 3, the skirt part 30a varies in length, thereby coping with variation in depth of the fuel tank 1.

In this Embodiment 3, it is obvious that a discharge path is formed by the conductive plate spring 20 or the conductive spring 21 described in the foregoing Embodiment 2 in place of the earth conductor 19.

The operation of pressurizing the fuel liquid in the fuel tank, filtering out dust in the fuel liquid, and supplying the fuel liquid to the internal combustion engine in each embodiment is the same as the operation in the conventional system, and explanation of the operation is omitted herein.

INDUSTRIAL APPLICABILITY

In the fuel supply apparatus according to the present invention described above, in order to dissipate static electricity generated by friction between the filter and the fuel liquid passing through the filter in the fuel filter, the support frame of the filtering element is made of a conductive thermoplastic resin, the communicating hole is formed on the lid housing so that a part of the exposed pedestal is exposed when the housing of the fuel filter comprised of the main housing and the lid housing is heat welded at a welding face, and the earth conductor is connected to this exposed pedestal, thus connecting the earth conductor without fail to the portion where inside static electricity is collected.

The exposed pedestal of the support frame is disposed at the same height as the heat welding face of the main housing, the end of the peripheral wall for the communicating hole is disposed at the same height as the heat welding face of the lid housing, and the exposed pedestal is welded and sealed fluid-tight simultaneously with formation of the housing of the fuel filter by heat welding, and consequently, working efficiency in welding is improved.

Since the main housing and the lid housing are made of normal thermoplastic resin, which is an insulating material, strength is improved and cost is reasonable.

What is claimed is:

1. A fuel supply apparatus comprising:

a fuel filter including a filtering element accommodated in a housing container for filtering a fuel liquid; and a fuel pump disposed to communicate to an inlet of said fuel filter for pressurizing and delivering the fuel liquid, wherein said housing container includes a main housing and a lid housing both made of a thermoplastic resin, said main housing and said lid housing are heat welded together at a welding face;

said filtering element includes a filtering member and a support frame having a exposed pedestal, said exposed pedestal has one face positioned at the same height as said welding face when said filtering element is accommodated in said main housing, said support frame is made of a conductive thermoplastic resin and supports said filtering member;

said lid housing has a peripheral wall forming a communicating hole communicated to outside, said peripheral wall has an end face positioned at the same height as said welding face and facing to said one face of said exposed pedestal; and an earth conductor is connected to said one face of said exposed pedestal through said communicating hole in the condition that said main housing and lid housing are heat welded, in which said filtering element is accommodated.

2. The fuel supply apparatus according to claim 1, wherein said earth conductor is welded and connected to said one face of said exposed pedestal simultaneously with heat welding said main housing and said lid housing, under the condition that the earth conductor made of a conductive thermoplastic resin is inserted in said communicating hole.

3. The fuel supply apparatus according to claim 1, wherein the earth conductor is inserted in said communicating hole, and said earth conductor is resiliently connected to said one face of said exposed pedestal.

* * * * *